United States Patent [19]

Fornasari

[11] Patent Number: 4,776,559
[45] Date of Patent: Oct. 11, 1988

[54] VALVE ACTUATED BY A DEVICE CONTAINING AN EXPANDABLE WAX ASSOCIATED WITH THERMISTORS

[75] Inventor: Paolo Fornasari, Alessandria, Italy

[73] Assignee: Eltek, S.p.A., Casale Monferrato, Italy

[21] Appl. No.: 26,569

[22] Filed: Mar. 17, 1987

[30] Foreign Application Priority Data

Apr. 2, 1986 [IT] Italy ................ 67262 A/86

[51] Int. Cl.⁴ .................................... F16K 31/04
[52] U.S. Cl. ............................ 251/11; 251/120; 236/68 R
[58] Field of Search ............. 251/11, 120; 236/68 R

[56] References Cited

U.S. PATENT DOCUMENTS

| | | | |
|---|---|---|---|
| 3,860,169 | 1/1975 | Norman | 251/11 X |
| 4,000,848 | 1/1977 | Braukmann et al. | 251/11 X |
| 4,043,532 | 8/1977 | Draxler | 251/11 |
| 4,560,140 | 12/1985 | West | 251/11 |

Primary Examiner—Arnold Rosenthal
Attorney, Agent, or Firm—Browdy and Neimark

[57] ABSTRACT

The present invention is a valve and valve housing designed for controlling the flow of water into washing machines comprising a molded plastic housing (1) with an inlet coupling (2) connecting the valve to the water supply, and an outlet coupling (3) connecting the valve to the washing machine; a poppet valve (4) located between said water inlet and outlet couplings normally remains closed with respect to its seat (5); the stem (4a) of said poppet valve (4) is associated with a leaf spring (8), and actuated by a piston (7) projecting from a casing (6) containing a wax with high thermal dilative properties; said casing (6) is in contact with one or more thermistors (9) (PTC) electrically powered through terminals (10) connected to the washing machine's timer, and having the purpose of opening the valve when the thermistor(s) is/are energized causing the wax contained in the casing (6) to expand inducing the axial movement of the piston (7), the leaf spring (8), and the poppet (4) of the valve, which retracts from its seat allowing water to enter the washing machine; said poppet is integral with the small diameter passage restrictor.

7 Claims, 1 Drawing Sheet

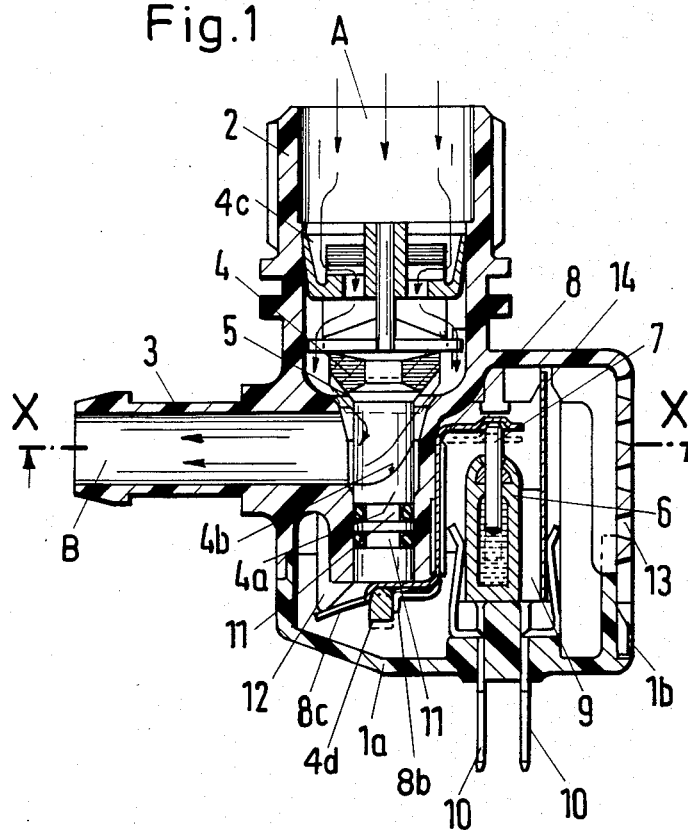
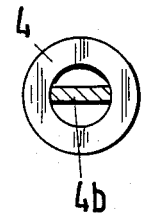
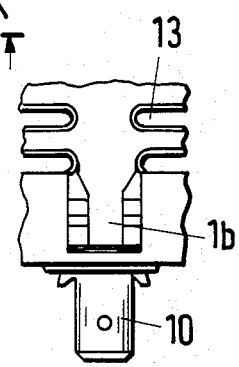
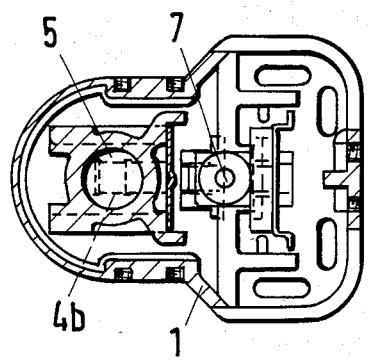
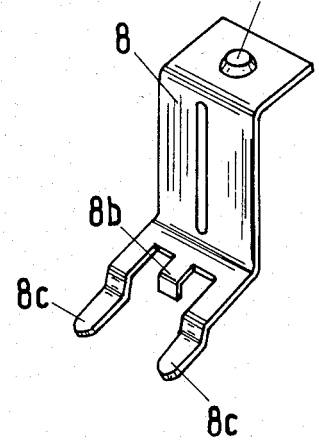

VALVE ACTUATED BY A DEVICE CONTAINING AN EXPANDABLE WAX ASSOCIATED WITH THERMISTORS

DESCRIPTION

The most common types of solenoid valves used in the water supply assemblies of washing machines comprise an electromagnet that opens or closes small water inlet orifices; a pressure drop occurs in said orifices; said pressure drop causes the opening or closing of the valve controlling the emission of water into the tub of the washing machine. The orifices causing this pressure drop are very small, and are therefore subject to clogging owing to scale deposits and/or impurities in the water. Flooding can occur if the water inlet valve is open when said orifices become clogged.

The purpose of the present invention is to provide a valve without capillary holes and electromagnets resulting in a low-cost device having a simplified design, which is reliable both when opening and closing.

The present valve comprises a molded plastic housing with two couplings, one connecting the valve to the water supply, and the other connecting the valve to the washing machine; said housing includes a frusto-conical water passage; said passage is controlled by a poppet valve whose stem is associated with a flat spring maintaining said valve in the closed position until said flat spring causes the valve to open as a result of the thrust of a plunger generated by a thermoactuator allowing the inflow of water to the tub of the washing machine.

The invention will be described further, by way of example, with reference to the accompanying drawings in which:

FIG. 1 is a vertical cut-away drawing of the valve;

FIG. 2 is a perspective view of the poppet valve of FIG. 1;

FIG. 3 is a front view elevation of the valve of FIG. 2, viewed in the direction of arrow C;

FIG. 3A is a sectional view along line III—III of FIG. 3;

FIG. 4 is a frontal view of part of the housing;

FIG. 5 is a view in perspective of the leaf spring.

With reference to FIG. 1, "1" indicates the molded valve housing made of a thermoplastic material. Said housing comprises a coupling 2 connecting the valve to the water supply, and a second coupling 3 connecting the valve to the washing machine. shown in detail in FIGS. 2, 3, and 3A, 4 indicates a poppet valve with mobile stem 4a mounted in a seat; said stem 4a comprises at least two circumferential grooves for o-rings 11 providing a seal. The poppet 4 is a single piece integral with flow restrictor 4b; the solid lines in FIG. 1 shown the positions of said poppet and flow restrictor when the valve is open; the valve is a normally closed type, and the poppet and flow restrictor are in the positions shown by the dashed lines in FIG. 1 when closed. The end of valve stem 4a is in contact with base 8b of leaf spring 8; portion 8a of said spring 8 is in contact with piston 7 projecting from casing 6; said casing 6 hermetically encloses a waxy mess having high thermal dilative properties (FIGS. 1 AND 5). Between branches or prongs 8c of spring 8, the end 4d of the stem 4a of the valve 4 is mounted where 4c indicates the connection of the valve to the water supply. Prongs or branches 8c of spring 8 are in contact with fixed stops 12 integral with housing 1. One or more thermistors 9 (PTC) are mounted adjacent to casing 6; the terminals 10 of said thermistor(s) are connected to the washing machine's timer. "14" indicates a plate designed to dissipate the heat generated by the thermistor(s) 9 when no longer energized; heat also escapes through vent 13 in the housing. "1a" is the portion of the housing that can be removed from part 1; the entire electrothermal device is contained in portion 1a of housing 1, and is fastened to said housing 1 with tabs 1b (FIG. 4). Valve stem 4a of the poppet contains a small diameter passage restrictor 4b having a curved profile (FIGS. 1, 2 and 3); said small diameter passage is located between poppet 4 and seals 11 (FIGS. 1, 2 and 3). The conical portion of poppet 4 is covered with rubber providing a good seal with seat 5.

The operation of the valve is as follows. As long as power is not supplied to the thermistor(s) 9, the valve remains closed as indicated by the dashed lines in FIG. 1. Under these conditions, piston 7 is partially immersed in casing 6, and spring 8 is in the position indicated by the dashed lines; poppet 4 rests in seat 5 sealing off all outlets for water entering at "A".

When the thermistor(s) 9 are energized by the timer they heat rapidly raising the temperature of casing 6; the wax contained in said casing expands forcing piston 7 to move outwards axially transmitting a thrust to element 8a of spring 8 pushing said spring into the position indicated by the solid lines in FIG. 1. Leaf spring 8 moves valve stem 4a axially, against the elastic reaction of its prongs 8c and fastened by stops 12, opening seat 5 allowing the water entering at "A" to go through the valve in the direction indicated by the arrows; the water flows by tapered stem with restrictor 4b (FIGS. 2, 3 and 3A), exits the valve through coupling 3, and is conveyed to the tub of the machine by a conduit B.

Water continues to flow into the tub of the machine as long as the thermistor(s) 9 are energized; when power is no longer supplied to said thermistor(s) 9 the temperature of casing 6 drops rapidly stopping the expansion of the wax contained therein; the elastic reaction of prongs 8c of leaf spring 8 forces piston 7 back to its initial position with respect to casing 6, and at the same time the thrust exerted on valve stem 4a ceases, causing poppet 4 to seal seat 5.

The above description illustrates the characteristics of the present valve which are a result of its simple structure that does not include electromagnets and other delicate, costly components which might compromise said valve's durability.

The advantages of this valve are its overall low cost and long-term reliability.

Part of the housing can be removed together with the whole thermoactuator assembly allowing rapid checks and the immediate replacement of this component, if necessary.

I claim:

1. An electrical valve designed for washing machines comprising a molded plastic housing (1,1a) with two couplings (2,3), an inlet coupling connecting the valve to the water supply, and an outlet coupling connecting said valve to the tub of the washing machine; said housing internally comprising a passage for water with a head (4) controlling the water; said head having a stem (4a) with a small diameter passage having a flow restrictor (4b); a leaf spring (8) connected to the end of said stem, whose opposite end is in contact with a piston (7) projecting from a hermetically sealed casing (6) containing a wax with high thermal dilative properties; said casing being in contact with at least one thermistor (9) (PTC) electrically powered through terminals (10) connected to a timer on the washing machine; the wax contained in said casing expanding when said at least one thermistor is energized inducing the axial movement of a piston (7); said movement being transmitted to the end of the stem (4a) of a head by a leaf spring (8); the elastic reaction of branches 8c of leaf spring 8 forcing piston 7 back to its initial position with respect to casing 6 when said thermistors (9) are no longer energized, and causing the valve to close.

2. An electrical valve as claimed in claim 1, in which the opening and closing movement of the head (4) with respect to the seat (5) is transmitted indirectly to stem (4a) by a thermoactuator (6,7).

3. An electrical valve as claimed in claim 1, in which the head (4,4a) is integral with the flow restrictor (4b).

4. An electrical valve as claimed in claim 1, in which said valve assembly includes a heat-dissipating plate (14) for the rapid cooling of the at least one thermistor (9) when no longer energized.

5. An electrical valve as claimed in claim 1, in which the base of the stem of the head comprises at least two circumferential grooves (11) for o-rings.

6. An electrical valve as claimed in claim 1, in which the middle portion of the heads stem is tapered to allow the passage of water when the valve is open.

7. An electrical valve as claimed in claim 1, in which the housing comprises two parts (1,1a), which are connected by tabs (1b) integral with one part that engage notches located in the other part.

* * * * *